Feb. 3, 1959   J. V. HUNN   2,872,349
GELLED PLASTISOL CARVING MEDIUM
Filed May 20, 1955

INVENTOR.
JAMES V. HUNN
BY Robert E. Bielek
ATTORNEY

United States Patent Office 2,872,349
Patented Feb. 3, 1959

2,872,349

GELLED PLASTISOL CARVING MEDIUM

James V. Hunn, Avon Lake, Ohio, assignor to The Sherwin-Williams Company, Cleveland, Ohio, a corporation of Ohio Application May 20, 1955, Serial No. 509,877

12 Claims. (Cl. 117—94)

This invention relates to a novel carving medium and more particularly to a novel carving medium useful in the process of making molds.

Present methods available for the production of original art work and the reproduction of such art work in the form of one or more relief, intaglio or other three-dimensional objects are cumbersome and for the most part, unsatisfactory. Therefore, there is a serious need for some commercially feasible working medium which is readily adaptable to and an improvement on prior art methods.

Ordinarily, three-dimensional works of art or designs are sculptured or otherwise fashioned into such workable materials as marble, clay, plaster of Paris, etc. If it is desired to duplicate these three-dimensional objects of art, a plaster of Paris mold is usually made from the original model. Wax is then poured into the plaster mold and this wax model is prepared for electroplating with a metal such as copper. The final step in this tedious procedure is electroplating. It is obvious that the common or usual method of duplicating a work of art requires a long time, often several days to a week. After the plating operation the wax is melted or burned out and the mold is now finally ready for production of molded articles.

Further, there are several difficulties with wax as a medium for the production of art work and the reproduction of such art work. It is fragile and has no elasticity. The surface is very hydrophobic, complicating the electrodeposition process. If the master is cast from a negative there is usually a considerable amount of shrinkage. The wax is heat sensitive and subject to distortion when heated or handled. The wax is also difficult to carve because of its brittleness.

It has now been found that the relatively new materials, plastisols, are admirably suited for use in the construction of media in which a design or art work may be easily carved to yield a unit subsequently useful in the production of molds for accurately reproducing the master. These plastisols when utilized in the manner hereinafter set forth avoid or substantially ameliorate the difficulties heretofore characteristic of wax and the other workable materials and have several advantages not possessed in any degree by wax, clay, plaster of Paris, etc.

It is a principal object of this invention, therefore, to provide a novel carving medium.

Another object of this invention is to provide a carving medium composed of a plastisol which lends itself readily to the production and duplication of three-dimensional works of art.

Other objects of this invention will appear as the description proceeds.

To the accomplishment of the foregoing and related ends, said invention, then, consists of the means hereinafter fully described and particularly pointed out in the appended claims and drawing, the following description setting forth in detail certain illustrative embodiments of the invention, such disclosed means constituting, however, but a few of the various forms in which the principle of this invention may be employed.

Broadly stated, then, this invention comprises a novel carving medium comprising a rigid base, a layer of fully cured plastisol superimposed on said base, and a layer of incompletely cured gelled plastisol superimposed upon said layer of fully cured plastisol.

More specifically stated, this invention comprises a substantially cylindrical carving medium comprising a rigid mandrel or core, a layer of fully cured plastisol superimposed on said mandrel, and a layer of incompletely cured gelled plastisol superimposed upon said layer of fully cured plastisol, said respective layers of plastisol being in concentric relationship with said mandrel or core.

Figure 1:
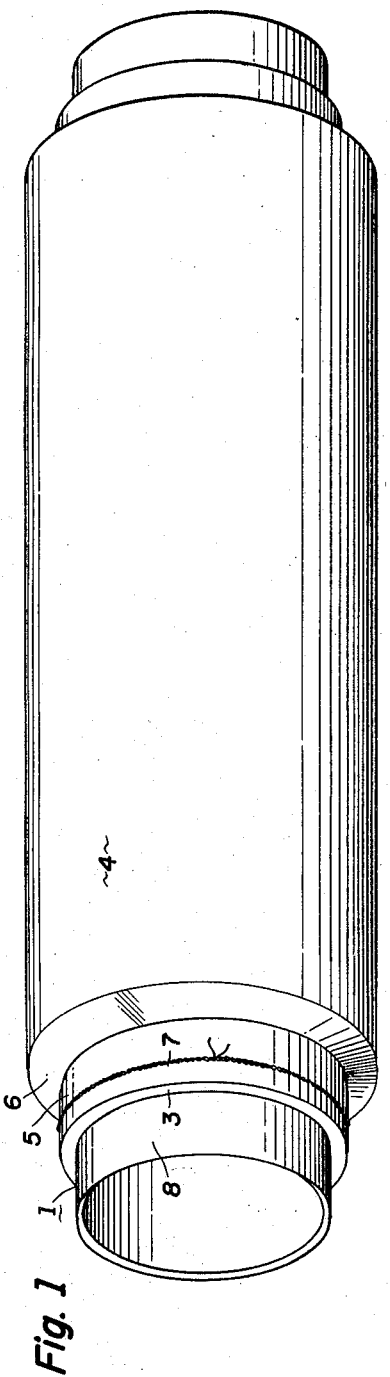
Fig. 1 is a perspective view of the novel carving medium of this invention.

In producing the carving media of this invention, use is made of certain properties of plastisols which have not heretofore been recognized as useful in the art of mold making and which greatly improve the results obtainable in many respects. A plastisol may be defined as an unplasticized vinyl resin dispersed in plasticizer. These are normally liquid materials. The freshly prepared plastisol will generally show a small increase in viscosity on standing at room temperature due to a very minor amount of solvation of the plasticizer into the resin. This appears to stop after a few days and the two-phase system becomes quite stable. Plastisols are produced from powdered polyvinyl resins, such as, polyvinyl chloride and co-polymers thereof with polyvinyl esters, e. g., polyvinyl acetate, by dispersing the unplasticized powdered resin in a plasticizer for the resin. In the co-polymers it is desirable to keep the percentage of vinyl ester low, i. e., no more than about 10%. The molecular weight of the vinyl halide resins used in the plastisols is desirably very high, i. e., on the order of 50,000 to 150,000 or more.

Under present day practices plastisols are prepared by using "stir-in" resins in powdered form. In other words, the powdered resin is merely stirred into the proper amount of plasticizer at about room temperature. It has been found in the course of the development of this invention that improved results hereunder are obtained if the plastisol is made by grinding the resin into the plasticizer at a low temperature, e. g., room temperature, up to about 100° F. using the grinding techniques common in the coating industry, such as roller milling. A finer dispersion is thus obtained improving the solvation rates at elevated temperatures and reducing the tendency to crumbling of the gel where very fine detail is being sought. Use of a polymeric plasticizer aids in decreasing the tendency to crumble present in certain plastisols. From 5% to 20% or more of such plasticizer is useful in this regard.

The plasticizer may be either of the monomeric type, such as, tricresyl phosphate, di-octyl phthalate, dibutyl phthalate, dibutyl sebacate, ortho nitro-diphenyl ether, etc., or of the polymeric type, e. g., polyesters. The dispersion of the unplasticized polyvinyl halide powder in the plasticizer yields a pourable liquid of about the consistency of paint, and at room temperature after initial adjustment it will maintain stability over a long period of time. The plastisol may be poured into a mold or form and cured by the application of heat at temperatures of just below the fusion point of the vinyl resin. Under the action of heat further solvation occurs and the plasticizer is absorbed into the resin and a solid rubber-like product is obtained. Reference may be had to the patent to Semon, 2,188,396, dated Jan. 30, 1940, for more specific details as to plastisols useful herein. Other useful plastisols are well known to those skilled in the art, and need not be mentioned here.

In general, the useful plastisols are characterized in that they have separate and distinct complete solvation and gellation temperatures. Gellation in a plastisol may be defined as that degree of partial solvation where the material changes from a non-solvated or partially solvated liquid to a partially solvated solid. The complete solvation temperature of the plastisol, while not necessarily a property of the resin alone, is more readily attributed to the resin and does not vary as widely from the true fusion point of the pure resin as does the gelling point when different plasticizers are used. These two temperatures should differ by at least about 15° F. and even more desirably by at least about 30° F. For example, a plastisol composed of 100 parts of polyvinyl chloride (powder) and 140 parts of di-octyl phthalate has a complete solvation temperature of about 350° F., and a gellation temperature from about 210° F. to 220° F. This composition is useful herein. With a polyester type plasticizer and about the same ratio of polyvinyl chloride to plasticizer, the gellation temperature is from about 300° to 320° F. and the complete solvation point is about 350° F. This composition is also useful herein. This difference in complete solvation and gellation temperatures is made use of in this invention. These temperatures are not to be confused with the fusion temperature of the resin in the plastisol. The fusion temperature is the point at which the resin in combination with the plasticizer melts and flows. The complete solvation temperature is just below this point and hence the shape imparted to the gelled plastisol is not lost or distorted by heating to the complete solvation point.

The time required to effect complete solvation appears to be only that which is required to heat the article being cured to the cure temperature throughout. For a piece about ¼ inch thick, 15 to 20 minutes is sufficient. Of course, the thicker the item being cured the longer the time required to bring the entire mass to within the temperature range of about 325° F. to 350° F. No chemical reaction is involved in curing the plastisols. Thus, depending upon the thickness of the piece being cured, the time may range anywhere from a few minutes to 1 or 2 hours. Exposure of a plastisol article a repeated number of times to curing temperatures does not appear in any way to affect the properties of the article.

These plastisols when merely gelled have a consistency like ordinary soap. When completely solvated or fused, however, they have a rubbery consistency. The plastisol after low temperature gelling or curing at a temperature below the complete solvation point can be carved with ordinary carving tools into any desired shape, design or pattern with great sharpness of detail. The material being non-brittle peels or abraids nicely before a hand or mechanical tool and does not chip, crack, or break up on cutting as does wax or other carving media. Since the pressure on the carving tool is even and not suddenly altered as by chipping of waste material from the cutting before the tool edge, the ease, accuracy, and detail obtainable are superior to other carving media.

It should be pointed out that the gelled plastisol described herein is different from the "Plastigels" which are plastisols thickened with metallic soaps such as aluminum stearate or other thickeners like Bentone. "Plastigels" do not carve readily like heated gelled plastisols.

Figure 2:
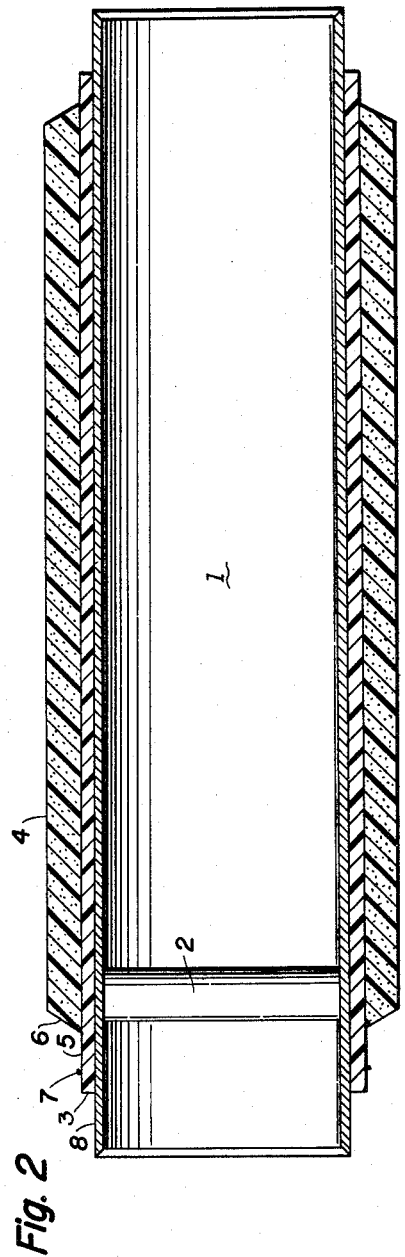
Fig. 2 is an axial cross-sectional view of said carving medium.

In order to illustrate a highly satisfactory mode of employing the principles of this invention for producing a design printing roller, the following procedure may be cited. Such printing rollers may be of the hand operated type or the much larger type used in wallpaper printing operations. As shown in Figs. 1 and 2, a machined central core or mandrel 1 made of any suitable rigid material, such as metal, e. g., aluminum, fiber, plastic, etc., is employed which is hollow, and may or may not be slightly tapered to one end thereof and which has a heavy pin 2 diameter-wise positioned about one inch in from the untapered end. The dimensions of this mandrel or core 1 are governed by the size of the carving or carved plastisol sleeve which is to be made and since for purposes of illustration a design printing roller is to be produced, the mandrel or core 1 should be substantially cylindrical. However, any mandrel or core suitable for the purpose may be employed. A plastisol blanket 3 is gelled onto this mandrel or core 1 and the thickness of the blanket 3 is approximately 1/16 to 3/16 of an inch, while the length of such blanket 3 is determined by the specific carving. In order to facilitate the carving procedure, to be described later, the plastisol blanket 3 may be colored by suitable pigments. In this way, the carver may cut quickly through the carving layer, added later, down to the colored blanket. However, the first layer of plastisol 3 may be uncolored.

The gelled plastisol blanket 3 superimposed on the mandrel or core 1 is then made a desired uniform diameter or thickness by any suitable means, such as by a live center lathe, the surface of blanket 3 being concentric with the core or mandrel 1. The turning, machining or otherwise conditioning of the surface of the gelled plastisol blanket 3 may be done either with the blanket unchilled or chilled with Dry Ice. Because this operation may remove a portion of the surface of the gelled plastisol blanket 3, the blanket 3 should be cast approximately 1/32" or more oversize.

After the attaining of the desired diameter and thickness, the plastisol under-blanket 3 is then completely cured by any suitable means at from about 325° to 350° F. while the sleeve (mandrel or core 1 and plastisol blanket 3) is being rotated slowly on its horizontal axis. This operation of rotating the sleeve while curing is done to keep deformation at a minimum during curing.

At this point it may be mentioned that with certain plasticizers, the time of partial solvation which is called gellation is not critical and although the plastisol should be gelled at a temperature not less than about 210° to 220° F. for a minimum period of about 20 to 30 minutes, it makes no difference how long the plastisol is subjected to this heat. Apparently there is a very stable condition occurring within the temperature range between the gellation point and the complete solvation point with plasticizers derived from phthalic acid, such as di-octyl phthalate and dibutyl phthalate. Such aliphatic alcohol esters of phthalic acid appear to reach only a certain degree of solvation with polyvinyl halide resins and proceed no further regardless of time of exposure after gellation has occurred and until the temperature is increased to the complete solvation point. The time within which the plastisol sets up or gels is, of course, dependent to some extent upon the proportion of plasticizer or solvating medium in the composition and also upon the thickness of the body in which gellation is to occur due to the rate of heat transfer. In general, about 2 hours is sufficient to solidify or gel a plastisol composed of 100 parts of polyvinyl chloride and 100 parts of dioctyl phthalate. This latter composition is also useful in this invention. For a sheet of plastisol about ¼ inch thick, exposure to gellation temperatures for a period of about 2 hours on a glass sheet or substrate is sufficient. Again with the composition last mentioned above, such a sheet of plastisol might be left in the furnace at 210–220° F. overnight without visibly altering the consistency of the plastisol as it appears at the end of 2 hours.

The core or mandrel with the completely cured plastisol blanket 3 thereon is placed into a cylindrical mold of proper diameter, and additional plastisol is gelled over the completely cured plastisol blanket. This second carving layer 4 of gelled material may have a different color from that of the first layer. Here again, the plastisol of layer 4 is gelled by heating to approximately 200–250° F. The thickness of the gelled carving layer 4 before conditioning should be approximately 1/16 of an inch or more than the desired finished thickness. The gelled carving layer 4 is then machined or otherwise conditioned by any suitable means, either chilled with Dry Ice or unchilled, as, for example, with a live center lathe, concentric with the core or mandrel 1 and having a uniform diameter. The thickness of this carving layer 4 after machining determines the relief of the design pattern. The carving layer 4 is also machined or cut in from its respective ends the proper distance, down to and exposing a portion of each end of the thoroughly cured under-blanket 3 as shown at 5. This is done to provide a true inner concentric surface in the ends of the mold for aligning the centers of the end caps on the molds. Each end of the carving layer 4 is sloped approximately 30°, as shown at 6, so that it approximates the slope put into the carving during the carving procedure. The length of the design is now fixed. A wire 7 may be tightly wound around one exposed end of the plastisol under-blanket 3. If the mandrel or core 1 is tapered, then the wire 7 is placed around the end of the blanket 3 closest to the untapered portion of the mandrel or core 1. The plastisol material employed in blanket 3 expands thermally when being cured and has a tendency to expand in both directions lengthwise and upon cooling might not return to its original shape. Thus wire 7 substantially limits expansion and contraction of the plastisol material in a fixed direction, greatly minimizing the possibility of deformation during curing.

The carver now has a finished carving medium which has a layer of readily carvable material superimposed on a rubber-like backing plate of the same platisol through which to carve.

In developing his art work, the carver cuts through the gelled layer 4 to the completely cured base 3 underlying the gelled layer 4 and lightly adhered thereto, which base layer 3 is not easily cut. Areas of gelled plastisol that are not desired in the final design or pattern can be easily removed by cutting through to the base layer 3, because at this stage the adhesion is at a minimum and the excised areas are readily separated at the interface. This facilitates and increases the ease and speed of carving. It should be stated at this time that when the completely cured under-blanket 3 of plastisol is machined or otherwise conditioned, the surface thereof is purposely left rough. In this way, when the plastisol carving layer 4 is gelled on the cured plastisol blanket 3, there is sufficient mechanical adhesion between the two layers to hold on the isolated portions of the art work. After the entire art work is carved into the gelled carving layer 4, the carver puts a fillet on all the sharp angles between the cured bottom plastisol layer 3 and the gelled top carving layer 4. This is done to aid in the electroforming or metal spraying processes. A plastisol putty is used as filleting material. This putty is made by heating plastisol until the viscosity is increased to that of ordinary putty at room temperature.

Another step which may be taken consists of coating the carved partially cured article with a thin coat or ungelled, uncured plastisol such as by coating the entire gelled plastisol and fully cured plastisol laminate with a paint brush dipped in the original liquid plastisol material. The plastisol may also be spray applied to the composite plastisol form after the shaping operation. This smooths out any roughness in the carving and serves to cement the raised portions of the carving to the cured base 3 after the composite article has been submitted to the final curing temperatures at slightly below the fusion point of the plastisols. It also serves to electrically isolate the exposed portions 8 of the mandrel or core 1 if made of metal. The slushing compound used preferably contains a small amount of a flow control agent such as Santocel C (colloidal silica), certain clays, and aluminum soaps. Technically speaking, these slushing compounds are plastisols or organosols. It is important that the plastisol slushing compound is applied lightly over the entire surface of the article, that is, over the exposed core (shown at 8) and plastisol portions. The sleeve or carving medium should be rotated on its horizontal axis while being sprayed or brushed with the slushing compound to insure uniform coating. The slushed carving sleeve is then rolled over an absorbent surface, such as blotting paper, which removes the excess slushing material or compound from the printing area of the design cut into the carving layer. The slushed article is cured at its lowest possible fusion temperature (about 325° F.) while being rotated horizontally on its axis for a time sufficient to increase the toughness of the plastisol material to the point where the carving is not easily damaged by further handling. Plastisol has a greater coefficient of thermal expansion than metal and will become loose on the metal core during curing. Thus, slow rotation is necessary to prevent deformation during the cure or to keep deformation at a minimum.

The carving sleeve which now bears the art work or design in relief is ready for the production of a mold by any well known method such as by electroforming or by metal spraying.

For purposes of illustrating how molds may be formed from a cured shaped positive made from the novel carving medium of this invention, electroforming or metal spraying will be briefly discussed. The cured shaped positive is now made ready for treatment preparatory to electroplating or electroforming. The HCl—SnCl$_2$ method of sensitizing may be employed or the surface may be sprayed with a molten metal, such as silver, utilizing new techniques of metal spraying. Electroforming or electroplating is then done in the usual manner to yield a metallic mold from which production copies of the original can be made. These molds are ordinarily from 1/16 to 1/8 of an inch thick. The metal core or mandrel 1 is then easily pulled out by means of the heavy pin 2. This leaves a hollow electroformed metal form containing the cured plastisol material. It is only necessary to forcibly pull out or dig out such plastisol material from the mold, leaving the mold ready to produce the design roller sleeves. The ends of the mold are cut back to the ends of the original colored blanket 3 and suitable end caps of preferably the same material as the mold are machined and fitted by suitable means into the concentric ends of the mold. Suitable means for casting the roller skins may then be employed. Although the discussion to this point has been largely limited to a substantially cylindrical carving composite, it is to be understood that the carving medium hereof is available in any shape so long as the several laminations are provided, e. g., a rigid base, a fused layer of completely solvated plastisol and an exposed surface layer of solid partially solvated, or merely gelled plastisol.

Another distinctly advantageous characteristic of these plastisol carving media in this art is the fact that any design to be carved in the gelled plastisol may be drawn directly on the surface of the gelled plastisol, preferably with a ball point pen, or the design may be drawn on a hectograph master sheet, the inked negative so obtained being placed on the surface of the gelled plastisol and the art work transferred to the gelled plastisol by moistening with the regular hectograph fluid (an alhol-water solution). This very materially assists the artist or designer or engraver in his carving operation.

It becomes convenient at this point to illustrate the composition of certain plastisols which may be used in the practice of this invention, it being understood, however, that any plastisol based on polyvinyl halides alone or other well known plastic materials may be used so long as they are characterized in undergoing partial solvation to an extent sufficient to provide a rigid carvable gelled body at a temperature sufficiently below the fusion point of the composition to permit interrupting the curing operation before complete solvation has occurred. These specific examples are for illustrative purposes only and are not to be construed as limiting the invention to the precise scope thereof as it becomes a simple matter to formulate by experimentation a vast number of resin-plasticizer compositions which by process of elimination can be found suitable for purposes of this invention.

Example I

| | Parts |
|---|---|
| Powdered polyvinyl chloride | 100 |
| Di-octyl phthalate | 100 |

Example II

| | |
|---|---|
| Powdered polyvinyl chloride | 140 |
| Di-octyl phthalate | 100 |
| Dilead phosphite | 7 |

Example III

| | |
|---|---|
| Powdered polyvinyl chloride-vinyl acetate (98%–2% respectively) | 100 |
| Dibutyl phthalate | 90 |
| Dilead phosphite | 5 |

Example IV

| | |
|---|---|
| Powdered polyvinyl chloride | 100 |
| Dibutyl phthalate | 100 |
| Dilead phosphite | 5 |

Example V

| | |
|---|---|
| Powdered polyvinyl chloride | 100 |
| Tricresyl phosphate | 95 |
| Dilead phosphite | 5 |

Example VI

| | |
|---|---|
| Powdered polyvinyl chloride | 100 |
| Dibutyl sebacate | 100 |
| Sodium sorbate | 5 |

Example VII

| | |
|---|---|
| Powdered polyvinyl chloride | 100 |
| Di-octyl phthalate | 50 |
| Acetylated castor oil monoglyceride | 50 |

Example VIII

| | |
|---|---|
| Powdered polyvinyl chloride | 100 |
| Di-octyl phthalate | 100 |
| Dibasic lead phosphite | 6 |

The foregoing examples represent but a few of the plastisol compositions which may be used in accordance with this invention. In general, these plastisols are colorless and yield a white or milky gel because of the two-phase system of resin dispersed in and partially solvated with plasticizer. Other ingredients may be incorporated in these compositions in amounts insufficient to substantially alter the physical properties of the plastisol essential to this invention but in amounts sufficient to impart color, for example, or sufficient to improve the hydrophilic character of the surface thereby aiding the electroplating operation, or flow control agents, such as colloidal silica (Santocel C), may be added to prevent undue flowing of the material during the gellation and complete solvation stages. If hydrophobic characteristics are desired, such flow control agents are incorporated in the composition when it is desired to re-coat the surface of the carved article either for purposes of adhesion of intaglio portions to the base and/or, for removing sharp angular corners at the intersection of the intaglio portion and the base to improve the electroplating operation. From 3% to 20% powdered graphite may be suspended in the formulations above given to improve the conductivity for electroplating purposes.

It also appears from the foregoing examples that the plasticizer portion may be composed of more than one plasticizer. The well known polyvinyl halide plasticizers are generally of the "primary" type, whereas plasticizers of the type represented by acetylated castor oil monoglyceride are of the secondary type and must be used in combination with one or more primary plasticizers. The aforementioned secondary plasticizer also confers upon the product desirable characteristics of heat and light stability.

It also appears from the foregoing examples that other powdered unplasticized resinous material may be used, such as, for example, polyvinyl bromide, polyvinyl chloride-vinyl butyrate co-polymers, and other such aliphatic acid esters of polyvinyl alcohol co-polymerized with polyvinyl chloride. These are generally of very high molecular weights, i. e., 50,000 to 150,000 or more.

Heat and light stabilizers may be incorporated in the formulas in amounts up to about 3% by weight. These may be the soluble type which dissolve in the plastisol or of the insoluble type. Usually these materials are acid acceptors which because of their basic nature accept HCl or HBr and prevent it from catalyzing further decomposition of the vinyl halide. Such materials include dibasic lead phosphite (dilead phosphite), tribasic lead sulphate, sodium sorbate, etc., all of which are well know for this purpose.

Under normal conditions, the gelled plastisol is a milky white opaque solid. The freshly prepared liquid dispersion is also milky white. Upon complete solvation, the plastisol will become transparent unless insoluble pigments or stabilizers are included.

This application is a continuation-in-part of my co-pending application Serial No. 404,136, filed January 14, 1954.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A carving medium comprising a rigid base, a layer of fully cured plastisol superimposed on said base, and a layer of incompletely cured gelled plastisol superimposed upon said layer of fully cured plastisol.

2. A substantially cylindrical carving medium comprising a rigid base, a layer of fully cured plastisol superimposed on said base, and a layer of incompletely cured gelled plastisol superimposed upon said layer of fully cured plastisol.

3. A substantially cylindrical carving medium comprising a rigid base, a layer of fully cured plastisol superimposed on said base, and a layer of incompletely cured gelled plastisol superimposed upon said layer of fully cured plastisol, said respective layers of plastisol being in concentric relationship with said rigid base.

4. A carving medium comprising a tapered rigid base, a layer of fully cured plastisol superimposed on said base, and a layer of incompletely cured gelled plastisol superimposed upon said layer of fully cured plastisol, said respective layers of plastisol being in concentric relationship with said rigid base.

5. A substantially cylindrical carving medium comprising a rigid base, a layer of fully cured colored plastisol superimposed on said base, and a layer of incompletely cured gelled plastisol having a color different from that of said fully cured plastisol layer superimposed upon said layer of fully cured plastisol, said respective layers of plastisol being in concentric relationship with said rigid base.

6. A carving medium comprising a tapered metal mandrel, a layer of fully cured plastisol superimposed on said mandrel, and a layer of incompletely cured gelled plastisol superimposed upon said layer of fully cured plastisol, said respective layers of plastisol being in concentric relationship with said tapered mandrel.

7. A carving medium comprising a rigid base, a layer of fully cured plastisol composed of about equal parts by weight of powdered polyvinyl chloride and a plasticizer therefor superimposed on said base, and a layer of incompletely cured gelled plastisol superimposed upon said layer of fully cured plastisol.

8. The product of claim 1 wherein the plastisol is a polyvinyl chloride plastisol.

9. A product of claim 1 wherein the plastisol is a powdered polyvinyl bromide.

10. The product of claim 1 wherein the plastisol is comprised of powdered polyvinyl chloride dispersed in a plasticizer therefor and up to 3% by weight of a heat and light stabilizer for the polyvinyl halide.

11. The product of claim 1 wherein the plastisol is comprised of powdered polyvinyl halide which has been ground at temperatures below about 100° F. into an approximately equal weight of a plasticizer therefor, up to 3% by weight of a heat and light stabilizer, and from about 3% to about 20% by weight of powdered graphite.

12. The product of claim 1 wherein the plastisol is composed of equal parts of powdered polyvinyl chloride and di-octyl phthalate, and contains dispersed therein about 2.5% by weight of dibasic lead phosphite.

References Cited in the file of this patent

UNITED STATES PATENTS

| 2,141,126 | Doolittle | Dec. 20, 1938 |
| 2,333,800 | Lewis | Nov. 9, 1943 |
| 2,486,258 | Chavannes | Oct. 25, 1949 |
| 2,536,323 | Spencer | Jan. 2, 1951 |
| 2,575,076 | Smyth | Nov. 13, 1951 |
| 2,626,222 | Spencer | Jan. 20, 1953 |
| 2,761,849 | Coler | Sept. 4, 1956 |

FOREIGN PATENTS

| 600,270 | Great Britain | Apr. 5, 1948 |

OTHER REFERENCES

"British Plastics" (Baird), April 1948 (page 167 relied on).